(12) United States Patent
Fan et al.

(10) Patent No.: US 7,907,377 B2
(45) Date of Patent: Mar. 15, 2011

(54) ARRANGEMENT AND METHOD FOR AN INTEGRATED PROTECTION FOR A POWER SYSTEM

(75) Inventors: Cheng-Hsuan Fan, Hsinchu (TW); Chao-Hsuan Chuang, Jhubei (TW); Hung-Che Chou, Jiadung Township, Pingtung County (TW); Ching-Hsiang Yang, Tauyuan (TW); Chih-Ping Tan, Chiunglin Township, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 12/318,721

(22) Filed: Jan. 7, 2009

(65) Prior Publication Data

US 2009/0116160 A1    May 7, 2009

Related U.S. Application Data

(62) Division of application No. 11/518,446, filed on Sep. 11, 2006, now Pat. No. 7,535,690.

(30) Foreign Application Priority Data

Sep. 14, 2005  (TW) .............................. 94131692 A (51) Int. Cl.
*H02H 3/00*  (2006.01)
*H02H 3/24*  (2006.01)

(52) U.S. Cl. .......................... 361/92; 361/93.9; 361/98

(58) Field of Classification Search ................ 361/92, 361/93.9, 98

See application file for complete search history.

(56) References Cited

U.S. PATENT DOCUMENTS

| 4,263,782 | A  | * | 4/1981  | Matsumoto et al. | ............ 60/276 |
| 4,517,502 | A  | * | 5/1985  | Aschoff et al.   | ............ 318/474 |
| 4,567,476 | A  | * | 1/1986  | Lang             | ........ 340/636.15 |
| 4,791,311 | A  | * | 12/1988 | Vig              | ............ 307/10.1 |
| 6,703,885 | B1 | * | 3/2004  | Fan et al.       | ............ 327/308 |
| 7,034,616 | B2 | * | 4/2006  | Tsuchiya et al.  | ............ 330/255 |
| 7,099,164 | B2 | * | 8/2006  | Zhu et al.       | ............ 363/21.12 |
| 7,235,950 | B2 | * | 6/2007  | Young et al.     | ............ 320/134 |

* cited by examiner

*Primary Examiner* — Stephen W Jackson
*Assistant Examiner* — Zeev Kitov
(74) *Attorney, Agent, or Firm* — Rosenberg, Klein & Lee (57) ABSTRACT

For protecting a power system, two or three of over current, thermal and under voltage protection circuits are integrated as one protection circuit but operate independently, and one or more protection points thereof are adjusted dynamically in response to detected condition of the power system. Specifically, using voltage and current conditions in the power system to modify the over current protection and the thermal protection maximizes the performance of the power system and covers the process bias in the circuits.

5 Claims, 7 Drawing Sheets

ARRANGEMENT AND METHOD FOR AN INTEGRATED PROTECTION FOR A POWER SYSTEM

RELATED APPLICATIONS

This application is a Divisional patent application of application Ser. No. 11/518,446, filed on 11 Sep. 2006 now U.S. Pat. No. 7,535,690. The entire disclosure of the prior application Ser. No. 11/518,446, from which an oath or declaration is supplied, is considered a part of the disclosure of the accompanying Divisional application and is hereby incorporated by reference.

FIELD OF THE INVENTION

The present invention is related generally to electric and thermal protections for power systems and, more particularly, to an arrangement and method for an integrated protection for a power system.

BACKGROUND OF THE INVENTION

In a power system, there is generally provided some limits or protections to prevent the power system circuit from electric or thermal damages. However, a power system usually suffers the protection point trade off issue as the power system works. If the protection point is choused higher limit in consideration of the process bias, the power system would be put in danger. But if a lower limit is choused, it would limit the system performance.

Figure 1:
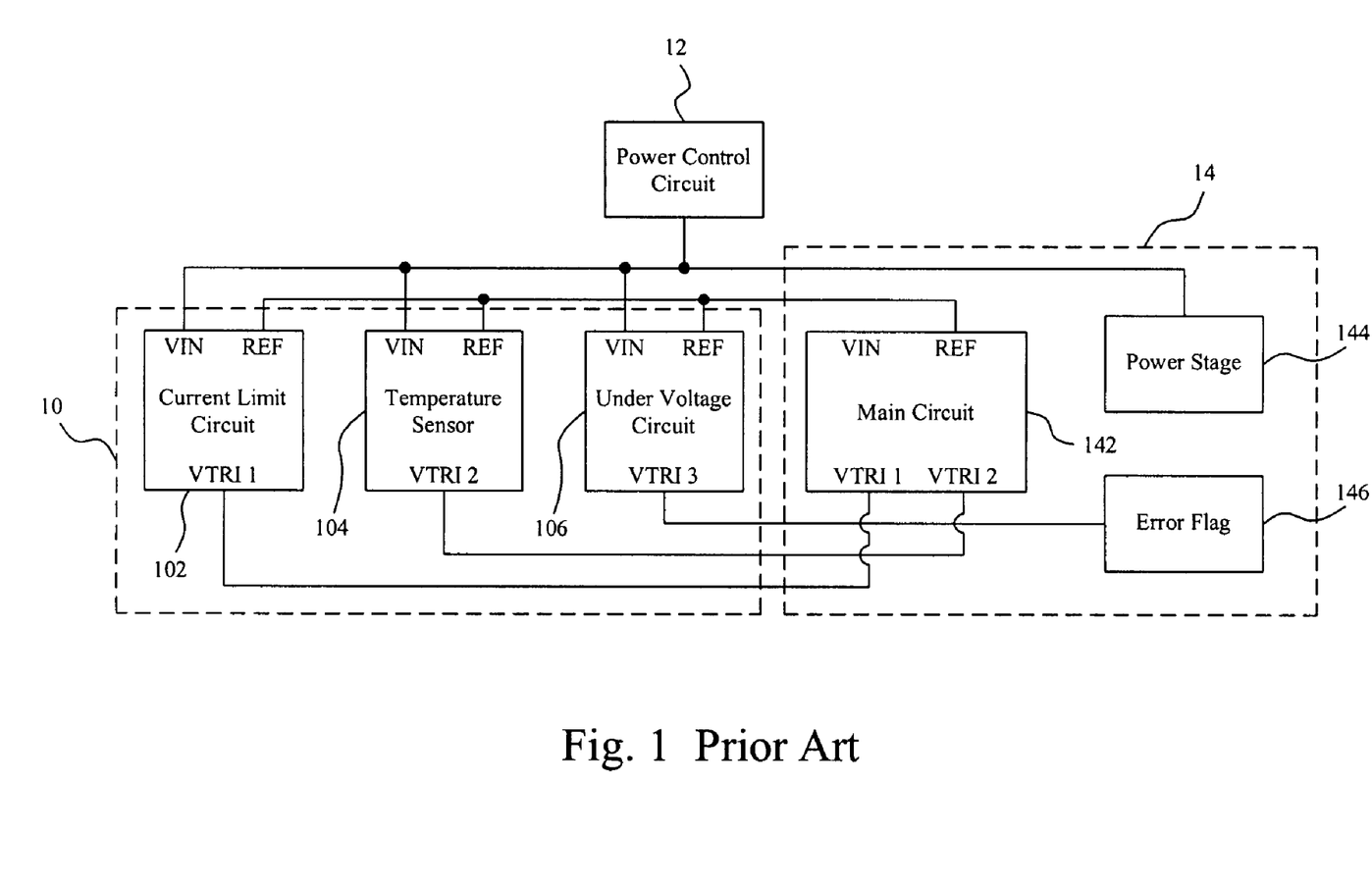
FIG. 1 shows a functional block diagram of a conventional protection scheme for a power system.

For more clear illustration, FIG. 1 shows a functional block diagram of a conventional protection scheme for a power system. A protection arrangement 10 is connected to an external power control circuit 12 and a power system 14, and the power control circuit 12 provides an input voltage VIN as the power source for the protection arrangement 10. The power system 14 comprises a main circuit 142, including for example reference voltage generator and amplifier, and a power stage 144 driven by the main circuit 142 to produce a regulated output voltage and an output current. Three protection circuits are provided in the protection arrangement 10, in which the current limit circuit 102 and the temperature sensor 104 are arranged parallel to control the main circuit 142 and limit over current condition and over thermal condition, and the under voltage circuit 106 will generate an error flag 146 to warren the power system 14 for under voltage condition. As shown in this example, the protection circuits 102, 104, and 106 in the protection arrangement 10 may use reference voltage REF provided by the main circuit 142 as bias control signals. The current limit circuit 102 monitors the output current of the power system 14 and provides a current limit signal VTRI1 for signaling the main circuit 142 once the output current is detected to hit a predetermined threshold, by which the main circuit 142 may adjust the current level and thus prevents the power system 14 from over current damage. The temperature sensor 104 monitors the working temperature of the power system 14 and provides a thermal protection signal VTRI2 for signaling the main circuit 142 once the temperature is detected to hit a predetermined threshold, in order to prevent the power system 14 from over thermal damage. The under voltage circuit 106 monitors the output voltage of the power system 14 and provides an under voltage signal VTRI3 to produce the error flag 146 once the output voltage is detected to hit a predetermined threshold, so as to adjust the output voltage level.

However, predetermined settings for the over current protection for the current limit circuit 102 and for the thermal protection for the temperature sensor 104 would be affected because of the process bias in the hardware of the protection arrangement 10. For example, a thermal protection condition is typically set between 150° C. to 170° C., but it could be down to 130° C. due to the process bias, and thus results in the power system 14 operating abnormally as in higher temperature. If a higher thermal protection condition is set for solving the process bias problem, the power system 14 may be burned-out in over thermal condition; but if a lower thermal protection condition is set, the performance of the power system 14 will decrease. The over current protection has the same problem.

Unfortunately, conventional protection circuits are all focusing on passive protections and therefore, they can only protect the power system but not improve the performance of the power system. It is thus desired an integrated protection for a power system with maximum system performance and reduced process bias.

SUMMARY OF THE INVENTION

Accordingly, an object of the present invention is to provide an arrangement and method for an integrated protection for a power system to maximize the system performance and cover the process bias.

According to the present invention, up to three of over current, thermal and under voltage protection circuits could be integrated as one protection circuit but operate independently. However, one or more protection points thereof could be adjusted dynamically in response to detected condition of a power system. In a common case, an arrangement for an integrated protection for a power system comprises a current limit circuit and a temperature sensor to prevent the power system from over current condition and over thermal condition, and an under voltage circuit to generate an error flag to warren the power system, by which if an under voltage issue occurs, the current limit will change to lower level, if an over current issue also occurs, the thermal protection will change to lower level, and if a thermal issue occurs, the power system will shutdown. Using voltage and current conditions in the power system to modify the over current protection and the thermal protection will maximize the performance of the power system and cover the process bias in the arrangement.

In a first embodiment of the present invention, an arrangement for an integrated protection for a power system comprises an under voltage circuit to monitor an output voltage of the power system, and to provide an under voltage signal and a first adjustment signal when the output voltage hits a first threshold, a current limit circuit to monitor an output current of the power system and to provide a current limit signal and a second adjustment signal when the output current hits a second threshold, and a temperature sensor to monitor a temperature of the power system and to provide a thermal protection signal when the temperature hits a third threshold, in which the first adjustment signal may adjust the second threshold, and the second adjustment signal may adjust the third threshold.

In a second embodiment of the present invention, an arrangement for an integrated protection for a power system comprises an under voltage circuit to monitor an output voltage of the power system and to provide an under voltage signal, a first adjustment signal, and a second adjustment signal when the output voltage hits a first threshold, a current limit circuit to monitor an output current of the power system and to provide a current limit signal and a third adjustment signal when the output current hits a second threshold, and a temperature sensor to monitor a temperature of the power system and to provide a thermal protection signal when the temperature hits a third threshold, in which the first adjustment signal may adjust the second threshold, and the second and third adjustment signals may adjust the third threshold.

In a third embodiment of the present invention, an arrangement for an integrated protection for a power system comprises an under voltage circuit to monitor an output voltage of the power system and to provide an under voltage signal and an adjustment signal when the output voltage hits a first threshold, a temperature sensor to monitor a temperature of the power system and to provide a thermal protection signal when the temperature hits a second threshold, in which the adjustment signal may adjust the second threshold.

In a fourth embodiment of the present invention, an arrangement for an integrated protection for a power system comprises an under voltage circuit to monitor an output voltage of the power system and to provide an under voltage signal and an adjustment signal when the output voltage hits a first threshold, and a current limit circuit to monitor an output current of the power system and to provide a current limit signal when the output current hits a second threshold, in which the adjustment signal may adjust the second threshold.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
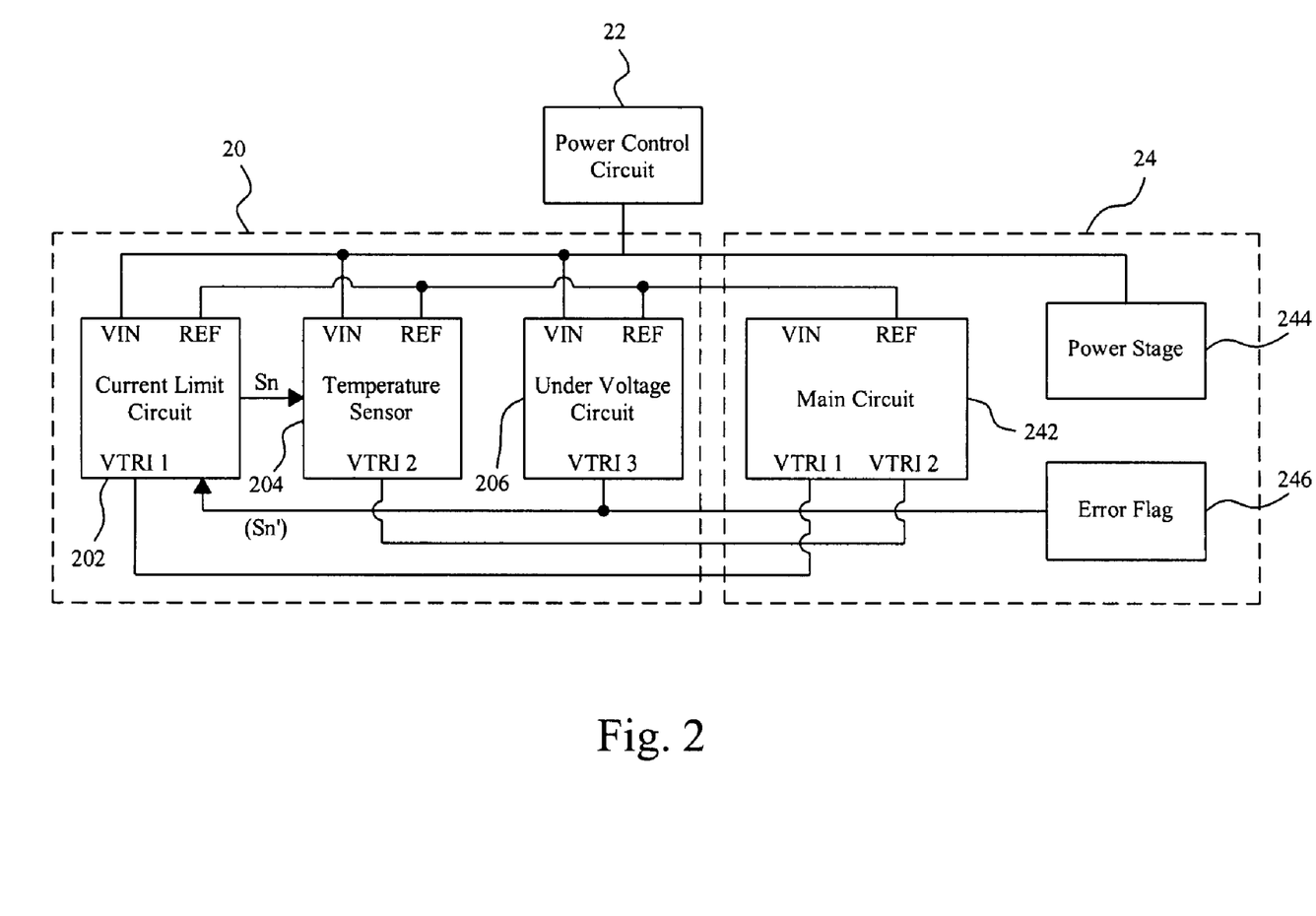
FIG. 2 shows a functional block diagram of a first embodiment according to the present invention.

FIG. 2 shows a functional block diagram of a first embodiment according to the present invention, in which a protection arrangement 20 is connected with an input voltage VIN from an external power control circuit 22 for getting power, a power system 24 comprises a main circuit 242 and a power stage 244 driven by the main circuit 242 to produce a regulated output voltage and an output current, and the main circuit 242 provides a reference signal REF for the protection arrangement 20 as control signals. In the protection arrangement 20, a current limit circuit 202 monitors the output current of the power system 24 and provides a current limit signal VTRI1 to signal the main circuit 242 when the output current hits a predetermined current limit threshold, so as to lower the output current, a temperature sensor 204 monitors the temperature of the power system 24 and provides a thermal protection signal VTRI2 for signaling the main circuit 242 when the temperature hits a predetermined temperature threshold, so as to avoid over thermal condition, and an under voltage circuit 206 monitors the output voltage of the power system 24 and provides an under voltage signal VTRI3 for generating an error flag 246 when the output voltage hits a predetermined under voltage threshold, so as to warrant the power system 24 an under voltage condition. In addition, when the system triggers an under voltage protection, the under voltage signal VTRI3 also signals the current limit circuit 202 to adjust the current limit for over current protection, and if the system further triggers an over current protection, the current limit circuit 202 will also signal the temperature sensor 204 by an adjustment signal Sn to change the thermal protection to a lower level. In this embodiment, the under voltage signal VTRI3 is also used as the adjustment signal Sn' to signal the current limit circuit 202 to change the current limit threshold; however, in other embodiments, an alternative one may be used.

Figure 3:
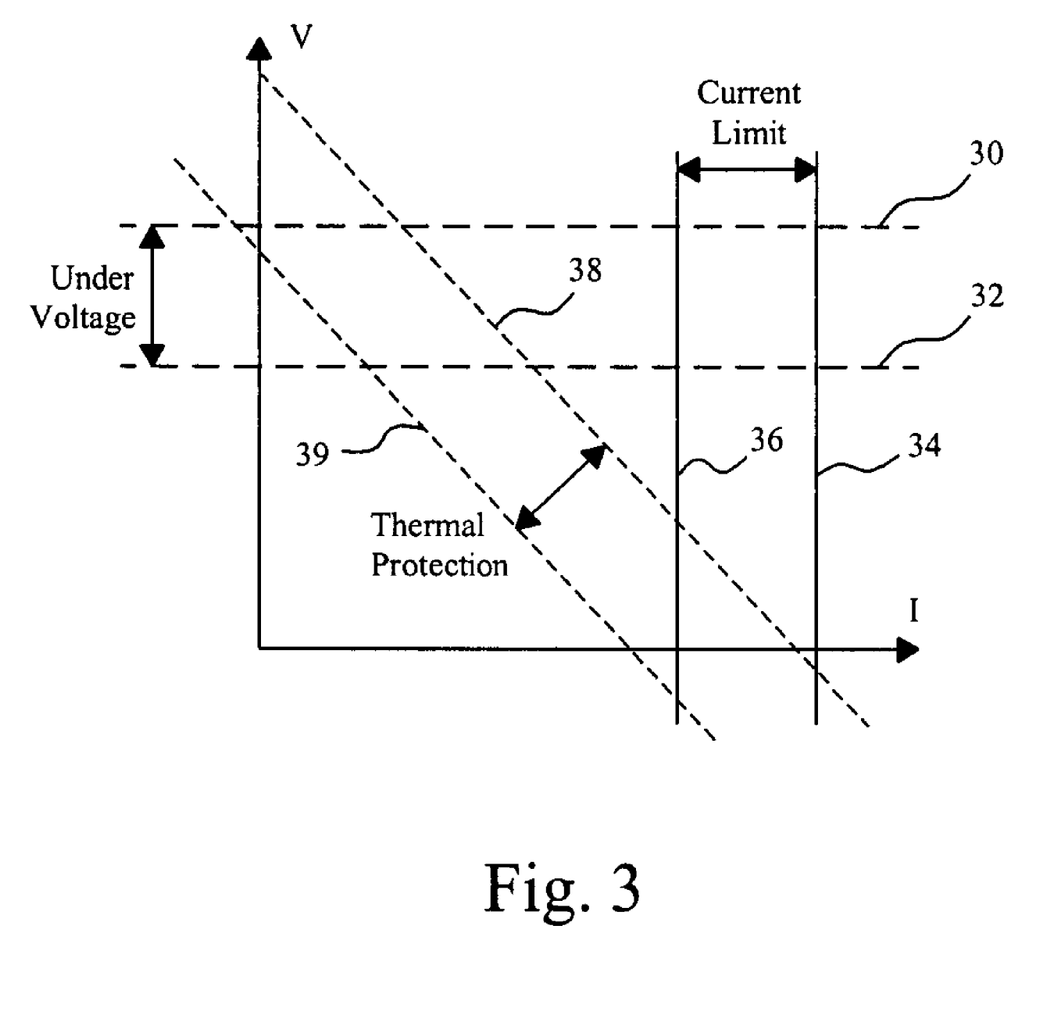
FIG. 3 is a diagram of illustrating the relationship among the under voltage protection, the over current protection, and the thermal protection.

FIG. 3 is a diagram of illustrating the relationship among the under voltage protection, the over current protection, and the thermal protection, in which dashed lines 30 and 32 are referred to the thresholds for under voltage protection, solid lines 34 and 36 are referred to the thresholds for over current protection, and dashed lines 38 and 39 are referred to the thresholds for thermal protection. Usually, the protection arrangement 20 could be set with higher thresholds to cover the process bias, thereby enhancing the performance of the power system 24. However, for example by the way illustrated in FIG. 2, once the output voltage of the power system 24 reaches an under voltage threshold, for example the dashed line 32, the protection arrangement 20 will lower the current limit threshold, for example from the solid line 34 to the solid line 36, and if the output current of the power system 24 also reaches the current limit threshold, the protection arrangement 20 further lowers the temperature limit, for example from the dashed line 38 to the dashed line 39, in order to prevent the power system 24 from over thermal condition.

For example, in a case that the power system 24 of FIG. 2 is set with a thermal protection temperature 170° C. with a hysteresis 30° C., and a current limit protection at 700 mA, it is referred that in normal circumstances, (1) if the power system 24 suffers high temperature environment as the temperature hitting 170° C., then the power system 24 will shutdown until the temperature lowers down to 140° C., and (2) if the power system 24 suffers heavy loading, then the current limit circuit 202 will clamp the output current at 700 mA, which is the general power system thermal and current limit protections work. However, when the system triggers the under voltage protection, then the under voltage signal VTRI3 will signal the current limit circuit 202 to change the current threshold to a lower level, for example 500 mA. If the system not only triggers the under voltage protection but also triggers the current limit mechanism, the current limit circuit 202 will signal the temperature sensor 204 to change the thermal protection to a lower level, for example 100° C. By this way, it will adjust the thermal protection as the under voltage and current limit triggered.

Figure 4:
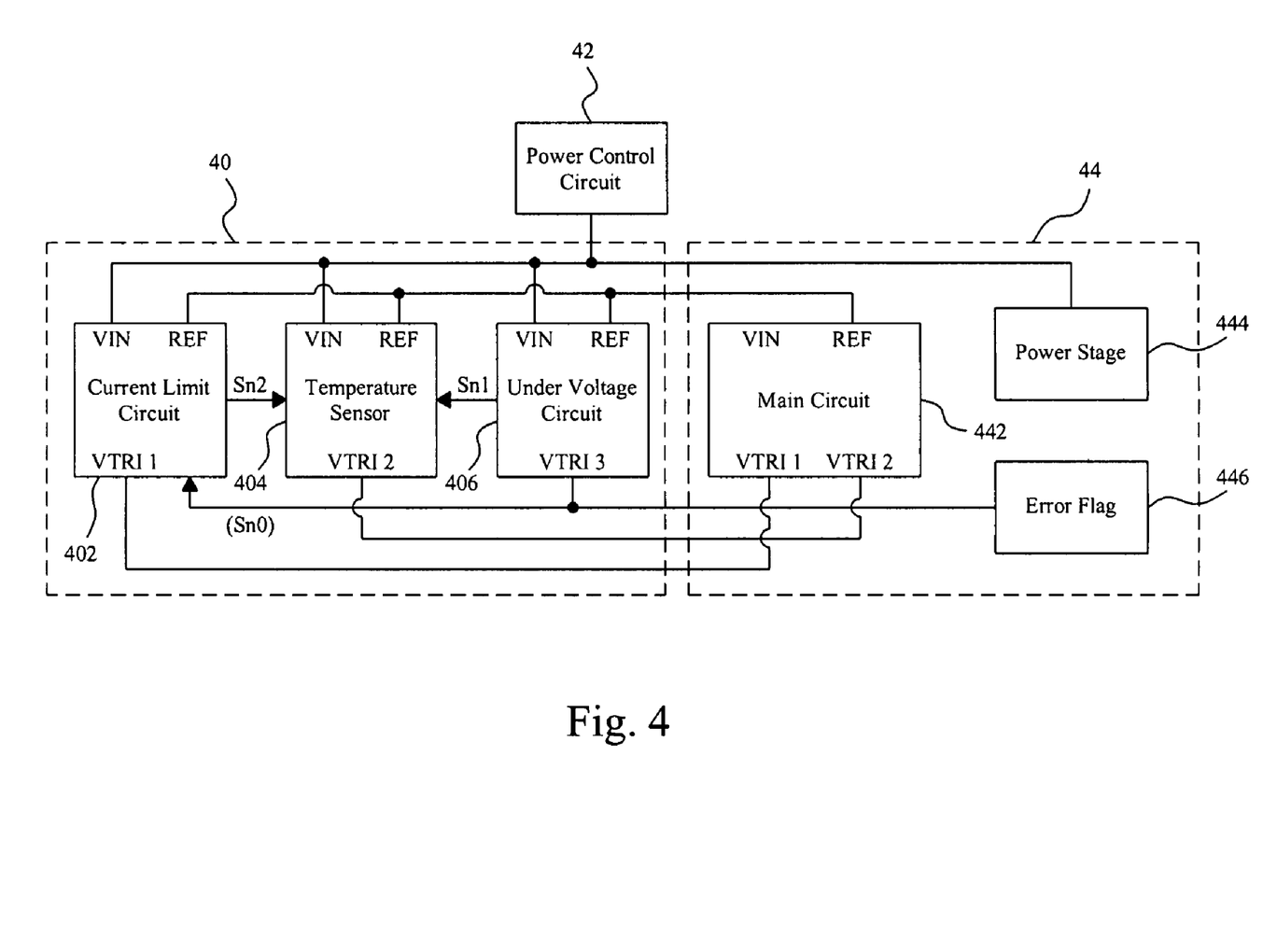
FIG. 4 shows a functional block diagram of a second embodiment according to the present invention.

FIG. 4 shows a functional block diagram of a second embodiment according to the present invention, in which a protection arrangement 40 is connected with an input voltage VIN from an external power control circuit 42 for getting power, a power system 44 comprises a main circuit 442 and a power stage 444 driven by the main circuit 442 to produce a regulated output voltage and an output current, and the main circuit 442 provides a reference signal REF for the protection arrangement 40 as control signals. In the protection arrangement 40, a current limit circuit 402 monitors the output current of the power system 44 and provides a current limit signal VTRI1 to signal the main circuit 442 when the output current hits a predetermined current limit, so as to lower the output current, a temperature sensor 404 monitors the temperature of the power system 44 and provides a thermal protection signal VTRI2 for signaling the main circuit 442 when the temperature hits a predetermined temperature threshold, so as to avoid over thermal condition, and an under voltage circuit 406 monitors the output voltage of the power system 44 and provides an under voltage signal VTRI3 for generating an error flag 446 when the output voltage hits a predetermined under voltage threshold, so as to warrant the power system 44 an under voltage condition. The under voltage circuit 406 also provides an adjustment signal Sn0 for the current limit circuit 402 and an adjustment signal Sn1 for the temperature sensor 404 when an under voltage is triggered, and in this embodiment, the adjustment signal Sn0 is the same as the under voltage signal VTRI3. By this way, if the power system 44 suffers an under voltage condition, it may also adjust the current limit threshold and the thermal protection temperature. Similarly, the current limit circuit 402 also provides an adjustment signal Sn2 for the temperature sensor 404 when a current limit is triggered, and by this way, if the power system 44 suffers a heavy loading to a current limit case, it may also adjust the thermal protection temperature. As such, the adjustment signals Sn0 and Sn1 are used to adjust the temperature threshold of the temperature sensor 404.

Figure 5:
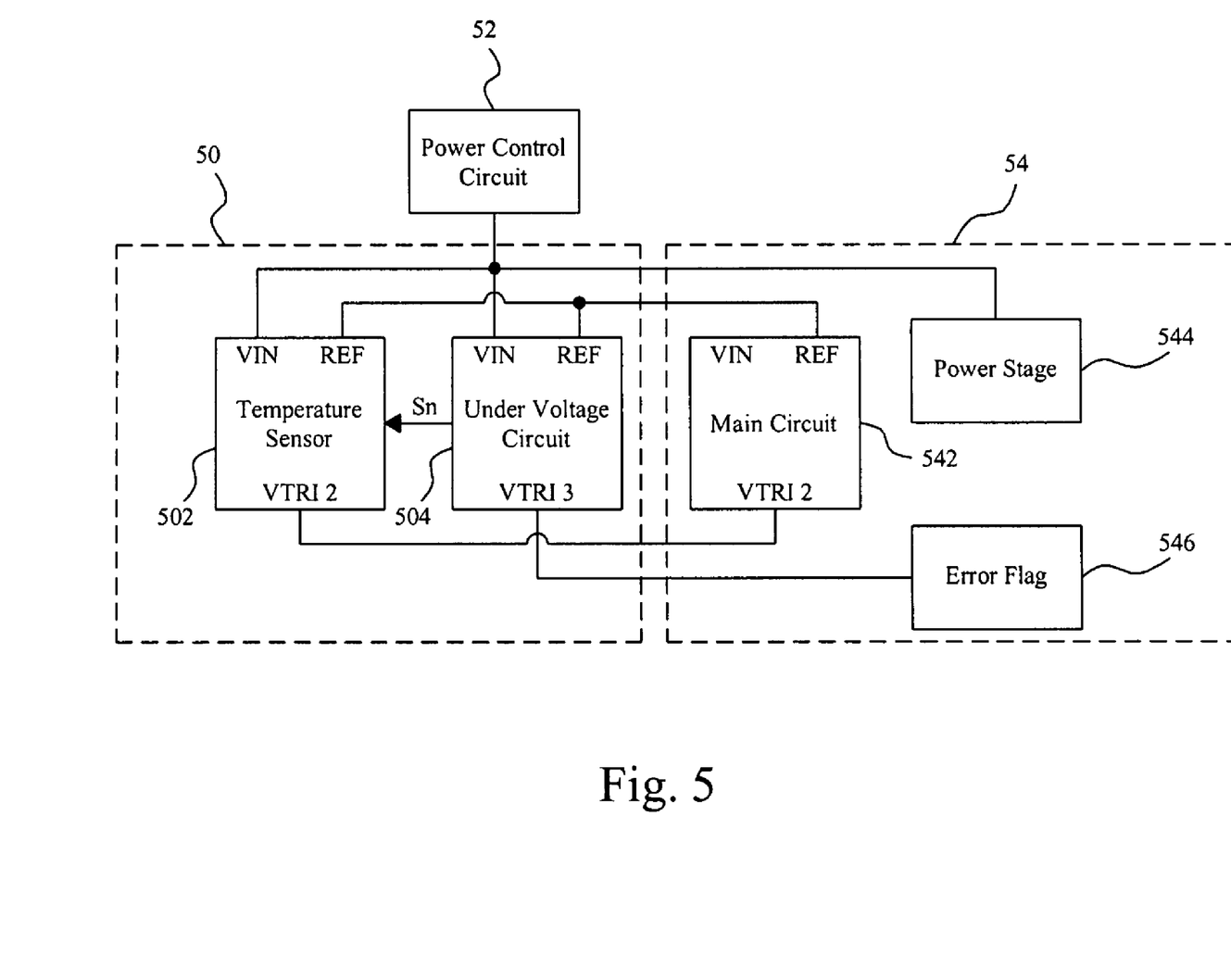
FIG. 5 shows a functional block diagram of a third embodiment according to the present invention.

FIG. 5 shows a functional block diagram of a third embodiment according to the present invention, in which a protection arrangement 50 is connected with an input voltage VIN from an external power control circuit 52 for getting power, a power system 54 comprises a main circuit 542 and a power stage 544 driven by the main circuit 542 to produce a regulated output voltage and an output current, and the main circuit 542 provides a reference signal REF for the protection arrangement 50 as control signals. In the protection arrangement 50, a temperature sensor 502 monitors the temperature of the power system 54 and provides a thermal protection signal VTRI2 to shutdown the power system 54 if the temperature hits a predetermined temperature threshold, and an under voltage circuit 504 monitors the output voltage of the power system 54 and provides an under voltage signal VTRI3 for generating an error flag 546 if the output voltage hits a predetermined under voltage threshold, so as to warrant the power system 54 an under voltage condition. The under voltage circuit 504 further provides an adjustment signal Sn for the temperature sensor 502 to adjust the thermal protection temperature when it is detected an under voltage occurred.

Figure 6:
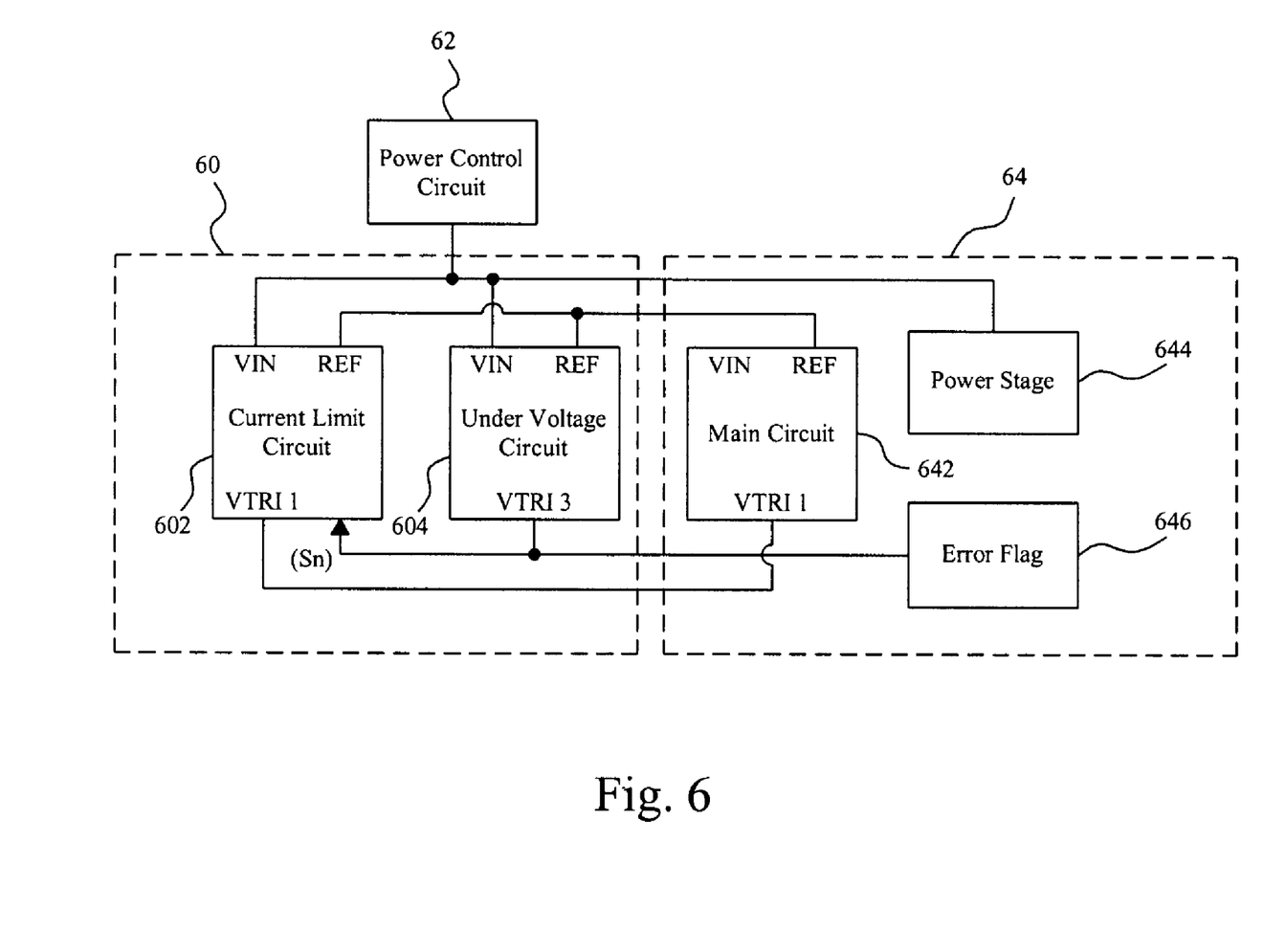
FIG. 6 shows a functional block diagram of a fourth embodiment according to the present invention.

FIG. 6 shows a functional block diagram of a fourth embodiment according to the present invention, in which a protection arrangement 60 is connected with an input voltage VIN from an external power control circuit 62 for getting power, a power system 64 comprises a main circuit 642 and a power stage 644 driven by the main circuit 642 to produce a regulated output voltage and an output current, and the main circuit 642 provides a reference signal REF for the protection arrangement 60 as control signals. In the protection arrangement 60, a current limit circuit 602 monitors the output current of the power system 64 and provides a current limit signal VTRI1 to signal the main circuit 642 if a current limit triggered, so as to clamp the output current of the power system 64, and an under voltage circuit 604 monitors the output voltage of the power system 64 and provides an under voltage signal VTRI3 for generating an error flag 646 to warren the system if an under voltage occurs. The under voltage circuit 604 also uses the under voltage signal VTRI3 as an adjustment signal Sn to change the current limit threshold of the current limit circuit 602 when an under voltage is detected. In other embodiments, an alternative signal may be used as the adjustment signal Sn.

Figure 7:
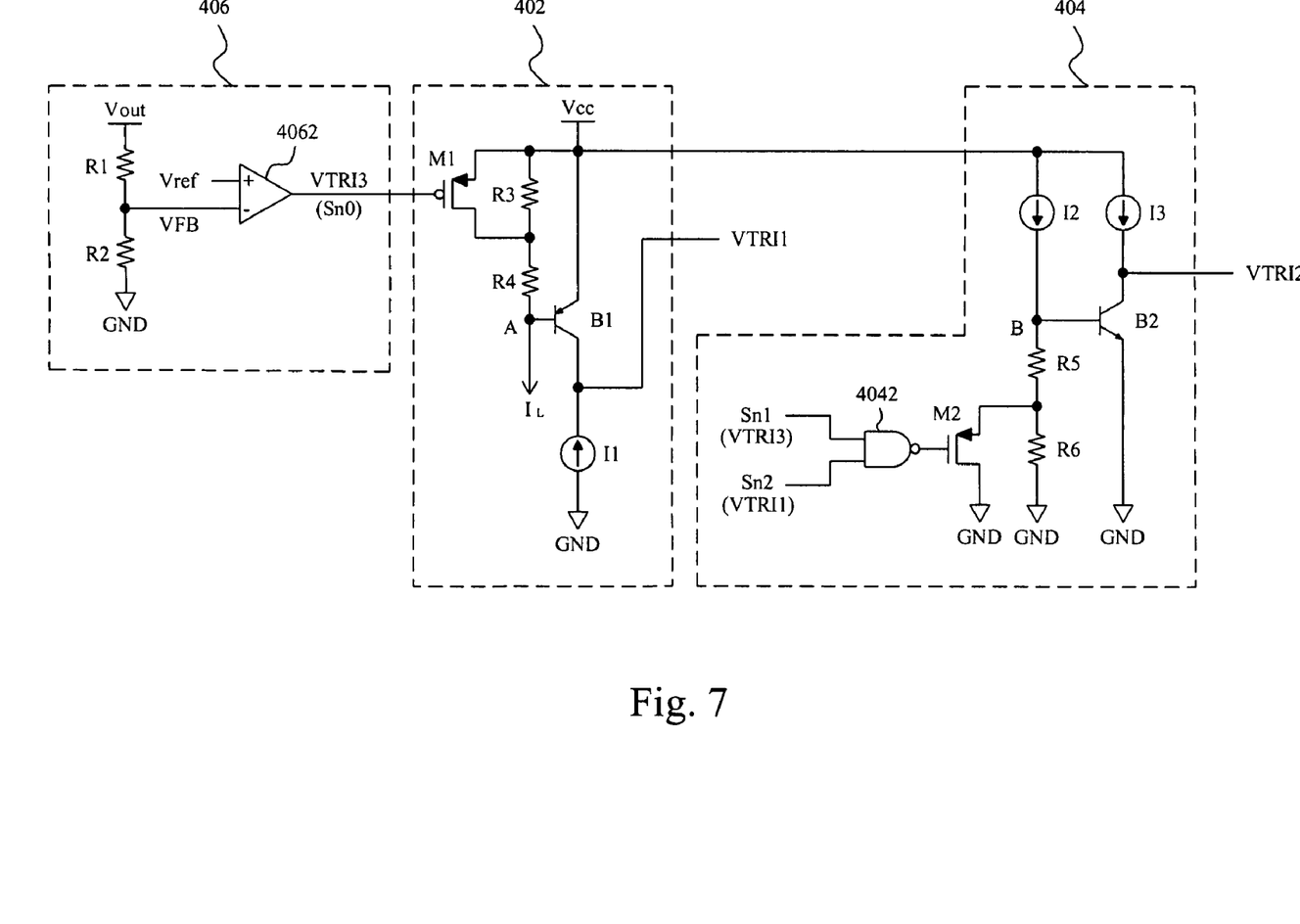
FIG. 7 shows a circuit diagram of an embodiment for the protection arrangement shown in FIG. 4.

FIG. 7 shows a circuit diagram of an embodiment for the protection arrangement 40 of FIG. 4, and in this embodiment, the under voltage signal VTRI3 is used as the adjustment signal Sn1, and the current limit signal VTRI1 is used as the adjustment signal Sn2. In the under voltage circuit 406, the output voltage Vout of the power system 44 is divided by a voltage divider of resistors R1 and R2 to generate a feedback voltage VFB, and a compactor 4062 compares the feedback voltage VFB with a reference voltage Vref to determine the under voltage signal VTRI3. In the current limit circuit 402, resistors R3 and R4 are connected in series between a power source Vcc and a node A, a PMOS M1 is parallel connected to the resistor R3 with its control gate connected with the under voltage signal VTRI3, a bipolar junction transistor (BJT) B1 and a current source I1 are connected in series between the power source Vcc and ground GND with its base of the BJT B1 connected to the node A, and the output current $I_L$ of the power system 44 or a current proportional thereto is drawn from the node A. When the feedback voltage VFB is greater than the reference voltage Vref, the output VTRI3 of the comparator 4062 keeps the PMOS M1 on, and thereby bypasses the resistor R3. Accordingly, the output current $I_L$ flows through the PMOS M1 and the resistor R4, and in this case, the voltage on the node A increases as the output current $I_L$ increases. However, once the voltage on the node A is high enough to turn on the BJT B1, which indicates the output current $I_L$ hits a current limit threshold and the current limit signal VTRI1 is produced to signal the main circuit 442 to clamp the output current $I_L$. On the other hand, if the feedback voltage VFB hits the reference voltage Vref, the output VTRI3 of the comparator 4062 will turn off the PMOS M1, and thus the output current $I_L$ flows through the resistors R3 and R4. According to the Ohm's law, a current decreases with an increase in resistance when a constant voltage is supplied for a closed loop. Hence, the BJT B1 could be turned on by a lower output current $I_L$, which indicates a lower current limit threshold for triggering the current limit signal VTRI1. In the temperature sensor 404, a current source I2 is connected between the power source Vcc and a node B, a BJT B2 is connected between a current source I3 and ground GND with its base connected to the node B, two thermal resistors R5 and R6 are connected in series between the node B and ground GND, a NMOS M2 is parallel connected to the resistor R6 with its control gate connected to the output of a XOR gate 4042 which is controlled by the adjustment signals Sn1 (or VTRI3) and Sn2 (or VTRI1). When the output voltage Vout and the output current $I_L$ both do not reach the thresholds for protection, the current limit signal VTRI1 and the under voltage signal VRTI3 are low level, and the NMOS M2 turns on accordingly, so that the current I2 flows through the resistor R5 and the NMOS M2. If the temperature increases, the resistance of the resistor R5 increases too, and the voltage on the node B increases accordingly. Once the voltage on the node B is high enough to turn on the BJT B2, which indicates the temperature hits the thermal protection temperature, the thermal protection signal VTRI2 is triggered to signal the main circuit 442 to shutdown the system. On the other hand, the NMOS M2 is turned off by the adjustment signals Sn1 and Sn2 if the output voltage Vout and the output current $I_L$ trigger the under voltage and current limit protections, which results in the current I2 flowing through the resistors R5 and R6. According to the Ohm's law, in a closed loop, a voltage increases with an increase in resistance when a constant current is supplied thereto. Hence, the BJT B2 could be turned on at a lower temperature, which indicates a lower thermal protection temperature.

Although the circuit of FIG. 7 is illustrated for the protection arrangement 40 of FIG. 4, the circuits for the others shown in FIGS. 2, 5, and 6 could be conducted therefrom. For example, by replacing the XOR 4042 with the adjustment signal Sn (e.g., using the current limit signal VTRI1) through an inverter to control the NMOS M2 in the temperature sensor 404 of FIG. 7, it will be an embodiment for the protection arrangement 20 of FIG. 2; or, for the protection arrangement 50 of FIG. 5, the current limit circuit 402 and the XOR gate 4042 in the temperature sensor 404 of FIG. 7 are removed, and the under voltage signal VTRI3 is connected through an inverter to the gate of the NMOS M2 instead; or, removing the temperature sensor 404 of FIG. 7 will obtain an embodiment for the protection arrangement 60 of FIG. 6.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An arrangement for an integrated protection for a power system, comprising:
    an under voltage circuit coupled to an output of the power system being protected for monitoring an output voltage therefrom, the under voltage circuit having an output coupled to the power system and outputting an under voltage signal responsive to a decrease of the output voltage of the power system being protected to a first threshold value; and
    a current limit circuit coupled to the output of the power system being protected for monitoring an output current thereof, the current limit circuit outputting a current limit signal to the power system responsive to the output current of the power system being protected reaching a second threshold value, the current limit circuit having an input coupled to the output of the under voltage circuit for receiving the under voltage signal, the current limit circuit adaptively changing a magnitude of the second threshold value responsive to receipt of the under voltage signal.

2. The arrangement according to claim 1, wherein the under voltage circuit comprises a comparator for comparing the output voltage with the first threshold value to produce the under voltage signal.

3. The arrangement according to claim 1, wherein the current limit circuit comprises:
    a bipolar junction transistor having a base; and
    a variable resistor connected to the base, having a resistance changed from a first value to a second value responsive to receipt of the under voltage signal to thereby change the magnitude of the second threshold, and allowing the output current to flow therethrough, so as to apply a bias voltage to the base;
    wherein the bias voltage will cause the bipolar junction transistor to trigger the current limit signal when the output current reaches the second threshold value.

4. The arrangement according to claim 3, wherein the variable resistor comprises:
    two terminals for imparting the resistance therebetween;
    two resistors connected in series between the two terminals; and
    a switch for being switched by the under voltage signal to bypass one of the two resistors.

5. A method for an integrated protection for a power system, comprising the steps of:
    monitoring an output voltage of the power system being protected and outputting an under voltage signal responsive to a decrease of the output voltage of the power system being protected to a first threshold value;
    monitoring an output current of the power system being protected and producing a current limit signal responsive to the output current of the power system being protected reaching a second threshold value; and
    adaptively changing a magnitude of the second threshold value responsive to the output of the under voltage signal.

* * * * *